United States Patent [19]

Murphy

[11] 4,273,477
[45] Jun. 16, 1981

[54] METHOD AND APPARATUS FOR INSTALLING A DRY BULK OFF-LOADING SYSTEM

[75] Inventor: John T. Murphy, Audubon, Pa.

[73] Assignee: R & M Associates, Inc., Valley Forge, Pa.

[21] Appl. No.: 948,382

[22] Filed: Oct. 3, 1978

[51] Int. Cl.³ .............................................. B65G 53/40
[52] U.S. Cl. ..................................... 406/39; 248/300; 406/139
[58] Field of Search .................... 406/39, 139, 140, 96; 296/102; 280/756; 248/300, 214

[56] References Cited

U.S. PATENT DOCUMENTS

| 414,169 | 10/1889 | Reuschel | 248/300 X |
| 2,482,723 | 9/1949 | Wallace | 406/39 X |

OTHER PUBLICATIONS

Drawing No. 826-192-022, 42 Type, "AF Blower", Roots-Connersville Blower, 10/21/60.
"General Drawing 26192", Roots-Connersville Blower, 11/3/60.
Drawing No. 834-245-022, 76 Type AF Blower, Roots-Connersville Blower, 6/24/63.
"The PTO or Engine Driven Blowers", M-D Pneumatics, Inc., 1/1977.

Primary Examiner—Robert B. Reeves
Assistant Examiner—Gene A. Church
Attorney, Agent, or Firm—Benasutti Associates, Ltd.

[57] ABSTRACT

In a system which includes a blower for pnuematically off-loading solid particulate matter from an over-the-road carrier, such as a dry bulk tractor/trailer combination, the blower is integrated into the undercarriage of the tractor. The blower is rigidly suspended below a main frame member of the tractor by a bracket which positions the center of gravity beneath the frame member while maintaining the blower in a vertical position with respect to the undercarriage such that the lowest portion of the blower does not extend below the lowest portion of the undercarriage.

1 Claim, 3 Drawing Figures

U.S. Patent  Jun. 16, 1981  4,273,477
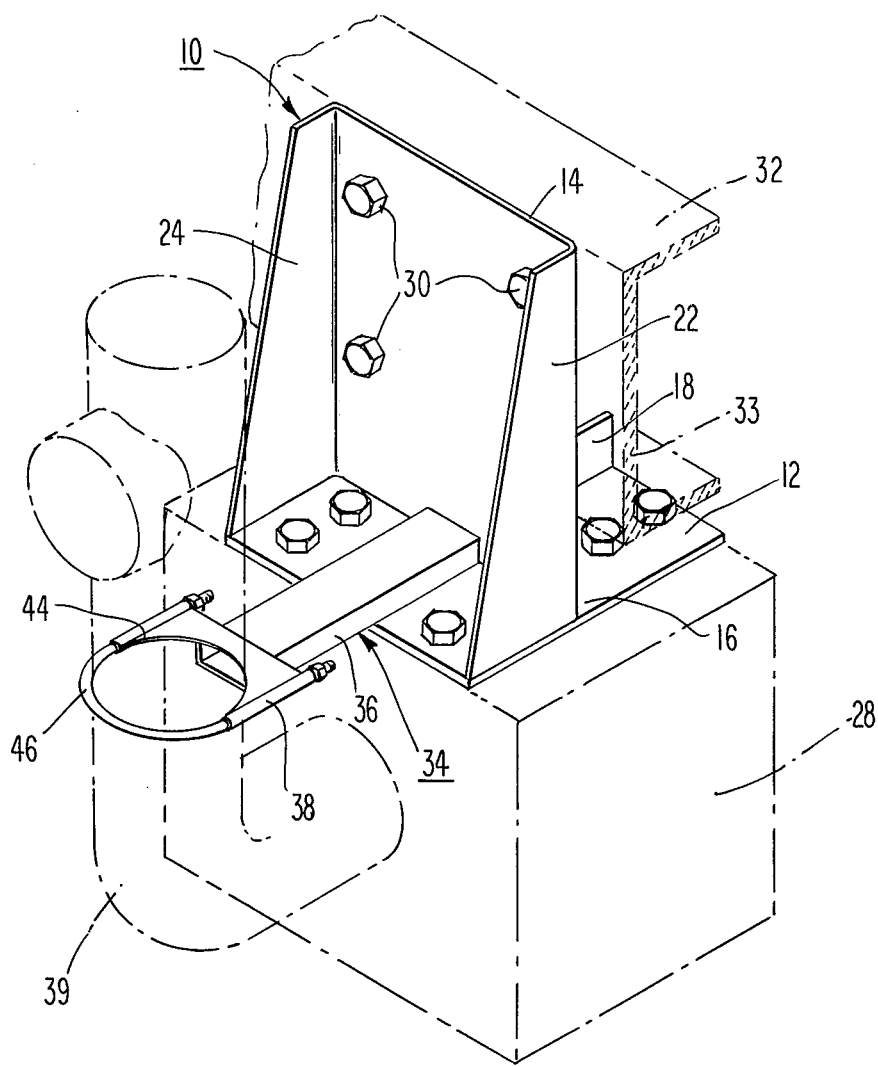
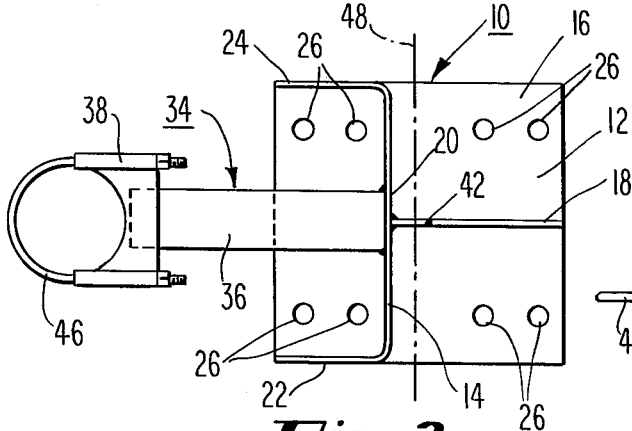
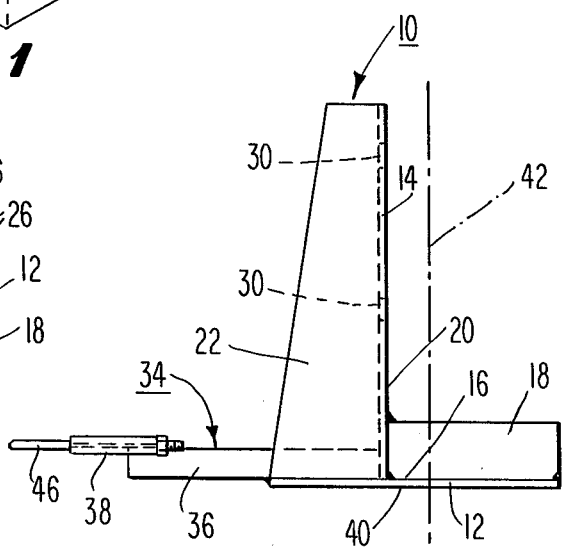

METHOD AND APPARATUS FOR INSTALLING A DRY BULK OFF-LOADING SYSTEM

BACKGROUND OF THE INVENTION

This invention relates to pnuematic systems for conveying solid particulate matter and particularly to a system for off loading solid particulate matter from an over-the-road dry bulk carrier.

Conventional over the road dry bulk carriers include a truck/tractor which pulls a trailer having a vessel thereon adapted to receive, store and discharge solid particulate matter, commonly known as dry bulk material such as flour, sugar, cement, etc. The conventional vessel has inlet apertures in the top thereof for receiving the dry bulk material from large storage hoppers, silos or the like. The bottom of the vessel has one or more tapering portions which terminate in a discharge aperture.

One common method of unloading the dry bulk material from the vessel is by use of a pnuematic conveying system. In a system such as this, the vessel is pressurized to a predetermined level, for example 12 to 15 PSI, by a blower. After the pressure within the vessel has reached the predetermined level, the air from the blower is diverted from pressurizing the vessel to pnuematic lines which flow past the outlet apertures of the vessel. When the outlet apertures are open, the combination of the pressure within the vessel and the venturi effect created by the air flowing past the outlet aperture causes the dry bulk material to be discharged from the vessel into the line carrying the air past the discharge apertures. This line is normally connected to the top of a using vessel, for example a storage hopper. The blower continues to force air past the outlet apertures until the vessel has been unloaded.

Various types of blowers have been used in off-loading systems of the type described above. One type of blower uses the exhaust from the tractor engine to drive a turbine. This is not only a relatively inefficient type of blower, it tends to have a detrimental effect on the engine, for example creating a back pressure which could burn the engine valves, and also tends to produce high air temperatures, for example on the order of 350°. Although this high temperature air would have little effect on a material such as cement, it could have a significant detrimental effect on other materials such as flour or particulate plastic materials.

Another type of blower which has been used is mounted on the trailer and requires a pony motor to drive it. This combination is not only heavy, the pony motor sometimes proves difficult to start especially in colder weather.

Another type of blower is driven from a power takeoff unit connected to the tractor engine. Blowers of this type are generally very noisy since high noise levels appear to be more tolerable in systems designed for outdoor operation.

SUMMARY OF THE INVENTION

A method and apparatus is disclosed for integrating a blower, of a low noise indoor factory use type, in a system for use in an over-the-road dry bulk materials carrier.

The use of quiet, efficient blowers in systems for off-loading materials from over-the-road dry bulk carriers is desirable even though the systems are normally operated out of doors. Among several reasons for this is the realization of the serious health hazard created by machinery operating at high noise level. In practically every system of this type, an operator, usually the truck driver, is required to operate the system. In those systems which use the truck engine to drive the blower, the blower noise, coupled with the engine noise, can create intolerable noise levels. Intolerable not only to the driver/operator, but to those individuals who happen to be in the area during the off-loading operation.

Due to these high noise levels, the times during which off loading can occur have been severely limited in those areas having residential communities nearby. In order to accommodate these residential neighbors, off-loading in such areas is commonly limited to the daylight hours or a portion thereof. A limitation such as this can created problems if the using facility operates 24 hours a day and happens to run out of a critical dry bulk material during the evening or nighttime hours.

Reduction of high noise levels created by rotating machinery such as blowers, is much more of a concern when this type of equipment is used in a factory environment. In the relatively enclosed environment of the factory, high noise levels can create not only an intolerable but perhaps a debilitating effect on workers in the area. As a result, steps have been taken to design factory blowers which operate at greatly reduced noise levels. However, since these blowers are designed for use in the factory, they are configured for use in the relatively spacious, hospitable factory environment. This environment generally permits the blowers to be installed at a convenient location on the factory floor. This relatively simple installation configuration is not amenable to installation on an over-the-road vehicle where available space is at a premium.

In addition, considerations of torsion and vibration are usually not given much notice in the factory environment since the blower is usually installed on the floor or some framework supported by the floor which is not prone to movement. This is to be contrasted with the vibration and torsion problems encountered on a truck frame.

Accordingly, it is an object of the present invention to provide a system for off-loading dry bulk material from an over-the-road transporting vehicle having reduced operating noise levels.

It is another object of the present invention to provide a method for installing a reduced noise, factory type blower on an over-the-road transporting vehicle.

It is a further object of the present invention to provide means for mounting a reduced noise, factory type blower amid the undercarriage of a truck/tractor whereby the blower does not extend below the lowest point of the existing undercarriage.

It is still another object of the present invention to provide a mounting means for a reduced noise, factory type blower on an over-the-road bulk material transporting vehicle which obviates the necessity of extensive blower redesign for adaptation to the vehicle environment.

This and other objects of my invention will become apparent from the following description with reference to the accompanying drawings.

BRIEF DESCRIPTION OF THE DRAWINGS

FIG. 1 is a perspective view of a blower mounting bracket of the present invention showing the relationship of the mounted blower to a vehicle frame member both of which are shown in phantom.

FIG. 2 is a plan view of the blower mounting bracket of the present invention.

FIG. 3 is a side elevational view of the blower mounting bracket of the present invention.

DETAILED DESCRIPTION OF THE DRAWINGS

Although specific forms of the invention have been selected for illustration in the drawings, and the following description is drawn in specific terms for the purpose of describing these forms of the invention, this description is not intended to limit the scope of the invention which is defined in the appended claims.

Referring now to FIG. 1, there is shown the preferred embodiment of a blower mounting bracket of the present invention, designated generally 10. As shown more clearly in FIG. 3, the blower mounting bracket 10 is substantially L-shaped, a blower attachment plate 12 forming one leg of the "L" and a frame attachment plate 14 forming the other leg of the "L". The frame attachment plate 14 is rigidly attached, for example by welding, to a second surface 16 of the blower attachment plate 12. In the preferred embodiment, the frame attachment plate 14 is substantially perpendicular to the blower attachment plate 12.

The blower mounting bracket 10 also includes a stiffener plate 18. One edge of the stiffener plate 18 is rigidly connected to the second surface 16 of the blower attachment plate 12, for example by welding thereto, preferably midway between the edges of the blower attachment plate 12. One end of the stiffener plate 18 is rigidly attached to, for example by welding, a first surface 20 of the frame attachment plate 14. A first side plate 22 and a second side plate 24 extend from opposite edges of the frame attachment plate 14 in a direction away from the stiffener plate 18. One end of each of the first 22 and second 24 side plates are rigidly attached, for example by welding, to the second surface 16 of the blower attachment plate 12. In the preferred embodiment, the frame attachment plate 14, the first side plate 22 and the second side plate 24 are formed by a U-shaped channel member, one end of which is welded to the second surface 16 of the blower attachment plate 12.

As shown in FIG. 2, the blower attachment plate 12 has eight blower attachment sites 26, each site being an aperture adapted to receive a bolt therethrough as shown in FIG. 1. The hole pattern formed by the blower attachment sites 26 matches a hole pattern formed in the top of a blower, shown in phantom and designated 28 in FIG. 1, each hole in the blower 28 being tapped to receive a threaded bolt.

As shown in FIGS. 1 and 3, the frame attachment plate 14 includes four frame attachment sites 30, each site being an aperture adapted to receive a bolt therethrough. The hole pattern formed by the frame attachment sites 30 matches a hole pattern in a frame member, shown in phantom and designated 32 in FIG. 1, of a tractor adapted to pull a dry bulk carrying trailer. In the preferred embodiment, a bolt is inserted through both sets of apertures, and secured by a nut fastened thereon.

An optional feature of the blower mounting bracket 10 is a blower discharge pipe support member, designated generally as 34 in FIGS. 1, 2 and 3. The pipe support bracket 34 includes a support arm 36 one end of which is rigidly attached, for example by welding, to the second surface 16 of the blower attachment plate 12.

In the preferred embodiment, the support arm 36 is a hollow channel member having a rectangular cross section. A muffler clamp 38 is rigidly attached, for example by welding, to the other end of the support arm 36. The size of the muffler clamp 38 is selected to correspond with the size of the blower discharge pipe 39 (shown in phantom in FIG. 1) to be used.

The method of installing the blower 28 on a truck/tractor (not shown) using the novel blower mounting bracket of the present invention is as follows. The blower mounting bracket 10 is fastened to the top of the blower 28 by means of bolts inserted through the blower attachment apertures 26 into corresponding tapped holes in the top of the blower. The hole pattern of the blower attachment apertures 26 is established in relationship to the center of gravity of the blower 28 such that the center of gravity lies on an axis which is substantially perpendicular to a first surface 40 of the blower attachment plate 12 and which is parallel to and displaced from, by a predetermined amount, the first surface 20 of the frame attachment plate 14. Such an axis is represented by the center line 42 in FIG. 3 which appears as a point 42 in FIG. 2. The distance by which the center of gravity axis 42 is displaced from the first surface 20 depends upon the width of the frame member 32 to which the bracket/blower assembly is to be attached. Using the novel blower mounting bracket 10 of the present invention, it is preferred that the center of gravity of the mounted blower 28 lie beneath the frame member 32 in proximity to a vertical segment 33. Consequently, the hole pattern of the blower attachment apertures in the blower attachment plate is established to enable the center of gravity of the blower to lie along this predetermined axis with respect to the truck frame member 32.

The blower mounting bracket 10, with the blower 28 attached thereto, is attached to the frame member 32 of the truck/tractor by first aligning the frame attachment apertures 30 with corresponding apertures in the frame member 32, then inserting bolts therethrough and fastening the bolts with nuts as is known in the art.

On those brackets including the optional blower discharge pipe support bracket 34, the blower discharge pipe 39 is aligned to be embraced within a semicircular portion 44 of the muffler clamp 38. A mating semicircular piece (not shown) mates with the muffler clamp 38, embracing the blower discharge pipe therebetween, thereby providing a firm support for the discharge pipe 39.

The blower bracket 28, now suspended from the blower mounting bracket, and vertically oriented as required for normal factory-type operation, is rigidly attached to the frame member 32 of the truck/tractor. The blower 28 is mounted such that the axis of the lower shaft is substantially parallel to line 48 of FIG. 2. The stiffener plate 18, as well as the first 22 and second 24 side plates serve to resist the twisting forces produced by the torque of the operating blower. In addition, the shape of the bracket is such that it brings the top portion of the blower 28 close to the bottom of the truck frame member 32. This feature serves to tuck the blower into the undercarriage of the truck, the bracket being configured such that the blower is mounted close enough to the frame whereby the bottom of the blower does not extend beneath the lowest portion of the existing truck undercarriage. This also serves to reduce the length of the blower moment arm thereby reducing torsional stresses on the truck frame member created by over-the-road vibrations.

It will be understood that various changes in the details, materials and arrangement of parts which have been herein described and illustrated in order to explain the nature of this invention, may be made by those skilled in the art within the principle and scope of the invention as is expressed in the following claims.

What is claimed is:

1. In a system for off-loading dry bulk material from a transporting vehicle, bracket for mounting a blower on a frame member of said vehicle whereby the center of gravity of said blower is beneath said frame member, said blower mounting bracket comprising:
   a. a first support member comprising a blower attachment plate having a first surface adapted for mating with said blower and a second surface opposite said first surface;
   b. a second support member extending from and substantially perpendicular to said second surface of said first support member, said second support member comprising a frame attachment plate having a first surface adapted for mating with said vehicle frame member and a second surface opposite said first surface;
   c. torsion resisting means comprising:
      i. first and second side plates extending from and substantially perpendicular to said second surface of said frame attachment plate, one edge of each of said side plates being rigidly attached to said second surface of said blower attachment plate; and
      ii. at least one stiffener plate extending from said second surface of said blower attachment plate, one edge thereof being rigidly attached to said first surface of said frame attachment plate; and
   d. pipe support means comprising:
      i. an elongate pipe support member having a substantially rectangular cross-section, a first end of said pipe support member being rigidly attached to said second surface of said blower attachment plate between said first and second side plates, adjacent said second surface of said frame attachment plate; and
      ii. means adapted to engage at least a portion of the periphery of a blower discharge pipe, said means rigidly attached to a second end of said pipe support member opposite said first end.

* * * * *